(12) United States Patent
Lagouche et al.

(10) Patent No.: US 10,595,670 B2
(45) Date of Patent: Mar. 24, 2020

(54) COUPLING OF A DEVICE FOR CONNECTING A BEVERAGE MACHINE TO A DISTRIBUTION NETWORK

(71) Applicant: NESTEC S.A., Vevey (CH)

(72) Inventors: Laurent Lagouche, Evian les Bains (FR); Bertrand Guyon, Saint Point Lac (FR); David Larzul, Meyzieu (FR)

(73) Assignee: Societe des Produits Nestle S.A., Vevey (CH)

( * ) Notice: Subject to any disclaimer, the term of this patent is extended or adjusted under 35 U.S.C. 154(b) by 503 days.

(21) Appl. No.: 15/324,874

(22) PCT Filed: Jul. 7, 2015

(86) PCT No.: PCT/EP2015/065414
§ 371 (c)(1),
(2) Date: Jan. 9, 2017

(87) PCT Pub. No.: WO2016/005351
PCT Pub. Date: Jan. 14, 2016

(65) Prior Publication Data
US 2017/0215634 A1    Aug. 3, 2017

(30) Foreign Application Priority Data

Jul. 9, 2014 (EP) .................................. 14176242

(51) Int. Cl.
*A47J 31/46* (2006.01)
*A47J 31/44* (2006.01)
(52) U.S. Cl.
CPC ............. *A47J 31/462* (2013.01); *A47J 31/44* (2013.01); *A47J 31/46* (2013.01)
(58) Field of Classification Search
CPC ........... A47J 31/44; A47J 31/462; A47J 31/46
(Continued)

(56) References Cited

U.S. PATENT DOCUMENTS 3,736,155 A * 5/1973 Martin .................. A47J 31/057
392/459
5,943,472 A  8/1999 Charles et al.
(Continued)

FOREIGN PATENT DOCUMENTS

CN   201076369 Y   6/2008
CN   101991348 A   3/2011
(Continued)

OTHER PUBLICATIONS

English Translation of Japanese Search Report for Japanese Appl No. 2015800359214.
(Continued)

*Primary Examiner* — Thien S Tran
(74) *Attorney, Agent, or Firm* — K&L Gates LLP (57) ABSTRACT

A connecting device is arranged for connecting a beverage machine (2) with an external liquid delivery system (3) to supply such liquid to the machine (2). The connecting device (1) has: a device body (16); an inlet (10) for a fluid connection to the external system (3); an outlet (13) for delivering liquid from the external system (3) via the inlet (10) to the machine (2); a valve arrangement (12a, 12b) switchable between an open configuration for establishing a fluidic connection between the inlet (10) and the outlet (13) and a closed configuration for interrupting the fluidic connection; and a control unit (14) for switching the valve arrangement (12a, 12b) between its open configuration and its closed configuration. The device body (16) has an assembly arrangement (16c; 16b, 16d, 16e, 16f) for reversibly or irreversibly assembling the device body (16) to the machine (2).

20 Claims, 3 Drawing Sheets

(58) Field of Classification Search
USPC ..... 99/275, 281, 292, 295; 426/87, 431, 433
See application file for complete search history.

(56) References Cited

U.S. PATENT DOCUMENTS

| | | | |
|---|---|---|---|
| 6,053,092 A * | 4/2000 | Anderson | A47J 31/44 222/383.1 |
| 7,165,488 B2 | 1/2007 | Bragg et al. | |
| 8,272,319 B2 | 9/2012 | Jarisch et al. | |
| 8,387,455 B1 | 3/2013 | Kaminski | |
| 8,646,377 B2 | 2/2014 | Stieger et al. | |
| 2007/0051246 A1 | 3/2007 | Suzuki | |
| 2008/0006159 A1 | 1/2008 | Fischer | |
| 2009/0293733 A1 * | 12/2009 | Martin | A47J 31/60 99/280 |
| 2011/0212236 A1 | 9/2011 | Nguyen et al. | |
| 2015/0245736 A1 * | 9/2015 | Reyhanloo | A47J 31/56 426/231 |

FOREIGN PATENT DOCUMENTS

| | | |
|---|---|---|
| CN | 203074321 U | 7/2013 |
| CN | 103298383 A | 9/2013 |
| CN | 103505057 A | 1/2014 |
| EP | 0244010 | 11/1987 |
| EP | 1208782 A1 | 5/2002 |
| EP | 1267687 A1 | 1/2003 |
| EP | 1447034 A1 | 8/2004 |
| EP | 1462040 | 9/2004 |
| EP | 1686879 A1 | 8/2006 |
| EP | 1731065 A1 | 12/2006 |
| EP | 1829469 A1 | 9/2007 |
| EP | 1864598 A1 | 12/2007 |
| EP | 1865815 A1 | 12/2007 |
| EP | 1867260 A1 | 12/2007 |
| EP | 1878368 A1 | 1/2008 |
| EP | 1943931 A2 | 7/2008 |
| EP | 2189087 A1 | 5/2010 |
| EP | 2189088 A1 | 5/2010 |
| EP | 2189089 A1 | 5/2010 |
| EP | 2222210 A2 | 9/2010 |
| EP | 2222211 A2 | 9/2010 |
| EP | 2222212 A2 | 9/2010 |
| EP | 2227121 A1 | 9/2010 |
| EP | 2227122 A1 | 9/2010 |
| EP | 2228633 A1 | 9/2010 |
| WO | 0154551 A1 | 8/2001 |
| WO | 0184993 A1 | 11/2001 |
| WO | 02078499 A1 | 10/2002 |
| WO | 03056987 A1 | 7/2003 |
| WO | 2004006742 A1 | 1/2004 |
| WO | 2004071259 A1 | 8/2004 |
| WO | 2005004683 A1 | 1/2005 |
| WO | 2006029763 A2 | 3/2006 |
| WO | 2006050769 A2 | 5/2006 |
| WO | 2007111864 A2 | 10/2007 |
| WO | 2007135136 A1 | 11/2007 |
| WO | 2008138710 A1 | 11/2008 |
| WO | 2009024500 A1 | 2/2009 |
| WO | 2009043630 A2 | 4/2009 |
| WO | 2009043851 A2 | 4/2009 |
| WO | 2009043865 A2 | 4/2009 |
| WO | 2009074550 A2 | 6/2009 |
| WO | 2009074553 A2 | 6/2009 |
| WO | 2009074555 A2 | 6/2009 |
| WO | 2009074557 A1 | 6/2009 |
| WO | 2009092746 A2 | 7/2009 |
| WO | 2009135821 A1 | 11/2009 |
| WO | 2009150030 A1 | 12/2009 |
| WO | 2010003932 A1 | 1/2010 |
| WO | 2010006953 A1 | 1/2010 |
| WO | 2010015427 A1 | 2/2010 |
| WO | 2010037806 A1 | 4/2010 |
| WO | 2010046442 A1 | 4/2010 |
| WO | 2010108700 A1 | 9/2010 |
| WO | 2010128109 A1 | 11/2010 |
| WO | 2011020779 A1 | 2/2011 |
| WO | 2011026853 A1 | 3/2011 |
| WO | 2011029813 A1 | 3/2011 |
| WO | 2011083103 A2 | 7/2011 |
| WO | 2011089210 A1 | 7/2011 |
| WO | 2011095502 A1 | 8/2011 |
| WO | 2011107574 A2 | 9/2011 |
| WO | 2011144719 A1 | 11/2011 |
| WO | 2011144720 A1 | 11/2011 |
| WO | 2011144723 A1 | 11/2011 |
| WO | 2011154492 A1 | 12/2011 |
| WO | 2011157675 A1 | 12/2011 |
| WO | 2012007260 A1 | 1/2012 |
| WO | 2012007313 A1 | 1/2012 |
| WO | 2012025258 A1 | 3/2012 |
| WO | 2012025259 A1 | 3/2012 |
| WO | 2012032019 A1 | 3/2012 |
| WO | 2012055765 A1 | 5/2012 |
| WO | 2012055767 A1 | 5/2012 |
| WO | 2012072758 A1 | 6/2012 |
| WO | 2012072764 A1 | 6/2012 |
| WO | 2012072766 A1 | 6/2012 |
| WO | 2012093107 A1 | 7/2012 |
| WO | 2012093157 | 7/2012 |
| WO | 2012126971 A1 | 9/2012 |
| WO | 2013098173 A1 | 7/2013 |
| WO | 2013104636 A1 | 7/2013 |
| WO | 2013104643 A1 | 7/2013 |
| WO | 2013127476 A1 | 9/2013 |
| WO | 2013127907 A1 | 9/2013 |
| WO | 2014032195 A1 | 3/2014 |
| WO | WO-2014032195 A1 * | 3/2014 ............. A47J 31/56 |
| WO | 2014056641 A1 | 4/2014 |
| WO | 2014056642 A1 | 4/2014 |
| WO | 2014056810 A1 | 4/2014 |
| WO | 2014056821 A1 | 4/2014 |
| WO | 2014056862 A1 | 4/2014 |
| WO | 2014060370 A1 | 4/2014 |
| WO | 2014096122 A1 | 6/2014 |
| WO | 2014096123 A1 | 6/2014 |

OTHER PUBLICATIONS

Japanese Search Report for Japanese Appl No. 2015800359214 dated Jul. 18, 2019.

* cited by examiner

COUPLING OF A DEVICE FOR CONNECTING A BEVERAGE MACHINE TO A DISTRIBUTION NETWORK

CROSS REFERENCE TO RELATED APPLICATIONS

The present application is a National Stage of International Application No. PCT/EP2015/065414, filed on Jul. 7, 2015, which claims priority to European Patent Application No. 14176242.7, filed Jul. 9, 2014, the entire contents of which are being incorporated herein by reference.

FIELD OF THE INVENTION

The present invention concerns the supply of liquid from a liquid distribution network, such as from a city water distribution network (typically the network supplying water to the tap valve in households), to a beverage preparation machine.

For the purpose of the present description, a "beverage" is meant to include any liquid food, such as tea, coffee, hot or cold chocolate, milk, soup, baby food, etc. . . . . A "cartridge" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid capsules containing the ingredient. The cartridge may contain an amount of ingredient for preparing a single beverage serving or a plurality of beverage servings.

BACKGROUND ART

Beverage preparation machines have been known for a number of years. For example, U.S. Pat. No. 5,943,472 discloses a water circulation system between a water reservoir and a hot water or vapour distribution chamber of an espresso machine. The circulation system includes a valve, metallic heating tube and pump that are connected together and to the reservoir.

A beverage preparation machine typically includes a housing containing a beverage processing module and a water tank in fluid communication with the beverage processing module. Examples of such beverage preparation machines are disclosed in EP 1 208 782, EP 1 267 687, EP 1 686 879, EP 1 731 065, EP 1 829 469, EP 1 864 598, EP 1 865 815, EP 1 867 260, EP 1 878 368, EP 2 222 210, EP 2 222 211, EP 2 222 212, EP 2 227 121, EP 2 227 122, US 2008/0006159, U.S. Pat. No. 7,165,488, WO 2007/111884, WO 2009/074553, WO 2010/015427 and WO 2012/055767.

Usually the water tank is removable to be refilled by a user when empty. Some systems include a continuous water supply by connecting the beverage machine directly to the city water distribution network, as for instance disclosed in CN201076369. This publication discloses a system that has a refillable water tank as well as an inlet for direct connection with the tap. Hence, beverage preparation can be carried out either by using water directly from the tap or from the water tank.

SUMMARY OF THE INVENTION

The invention thus relates to a connecting device for connecting a beverage preparation machine with an external liquid delivery system, e.g. a water distribution network, to supply such liquid to the machine. Typically, liquid is supplied to the connecting device at a pressure above the atmospheric pressure, e.g. in the range of 1.1 to 20 bar, typically 1.2 to 15 bar, such as 1.5 to 10 bar, for instance 2 to 6 bar.

For instance, the machine has a liquid storage tank, e.g. a tank with an upper opening, such as an opening delimited by a rim of the tank. The tank can be delimited by a bottom part and a peripheral wall extending from and above the bottom part towards the opening. For instance, the tank has an outlet for dispensing liquid to a beverage processing and deliver unit of the machine. Such an outlet can be located at the bottom part of the tank.

The tank can be removable or fixed in the machine. The tank can be manually refillable (typically when not fitted with the connecting device).

Alternatively, the tank can be a buffer reservoir integrated in machine and/or in the connecting device, e.g. not intended for manual refilling, the filling of which is controlled by the connecting device.

The connecting device has: a device body; an inlet for a fluid connection to the external system; an outlet for delivering liquid from the external system via the inlet to the beverage machine; a valve arrangement switchable between an open configuration for establishing a fluidic connection between the inlet and the outlet and a closed configuration for interrupting the fluidic connection; and a control unit for switching the valve arrangement between its open configuration and its closed configuration.

The control unit may be connected to at least one of: a power source via a power connector, such as an electric connector (e.g. plug or socket) to the mains with a voltage transformer and/or an electric connector (e.g. plug or socket) to the beverage machine with or without a voltage transformer; and a user interface such as an interface comprising a power and/or reset switch (such as an on/off switch and/or a switch for resetting the device, e.g. after an incident) and/or a control indicator e.g. a control light. The control indicator can for instance indicate: whether the device is on or off, and/or whether the valve arrangement are in the open or the closed configuration; and/or whether the device is properly functioning or malfunctioning; and/or whether the device is in a programming mode.

The valve arrangement may be connected to the inlet via a fluid connector e.g. a fluid connector fixed to a frame portion of the device body.

The device body has an assembly arrangement for reversibly or irreversibly assembling the device body to the machine, such as to a tank and/or to a main machine body of the machine.

The connecting device is irreversibly fixed by the assembly arrangement when the disassembly requires a destruction of at least one part of the device (or the machine) or when the disassembly requires a special tool (e.g. a physical key) or knowledge (e.g. an intellectual key) possessed by specially trained maintenance personal but no by average consumers.

For instance, such device when reversibly fixed forms a user-removable accessory fixed to the tank so that the outlet is positioned for delivering liquid into the tank via an upper opening of the tank.

Hence, the connecting device may be fitted onto new or existing beverage machines (retrofitting) and does not alter the integrity of the machine. Hence, the connecting device can be removed from the machine so that beverage machine can be operated by manually refilling its tank. Alternatively, the connecting device may be fully integrated into the machine, in a manner which is not intended to be disassembled by an ordinary user.

When the connecting device is provided as a user-removable accessory, the connecting device can be fitted onto machines that can be operated without the connecting device or with the connecting device. The connecting device is provided as a separable unit that can be fitted by a user to a beverage machine having a liquid tank.

The connecting device may be integrated in the beverage machine in a manner not intended to be disassemblable by a user.

The connecting device may be connected to and use sensors that are integrated in the beverage machine to monitor the tank, typically of the machine tank.

The control unit of the connecting device can be integrated in the control unit of the beverage machine, the electric powering of the connecting device being optionally supplied by the beverage machine.

The assembly arrangement may have a lower assembly arrangement, such as a foot from the device body, for reversibly or irreversibly assembling the body to a lower part of a machine tank and/or to a lower part of a main machine body. For instance, the lower assembly arrangement comprises a platform projecting from a bottom part of the device body and/or extending under the outlet.

The assembly arrangement can have an upper assembly arrangement, such as a top extending from the device body, for reversibly or irreversibly assembling the device body to an upper part of a machine tank and/or to an upper part of a main machine body. For instance, the upper assembly arrangement comprises an arm projecting from a top part of the device body and/or extending above the outlet, such as an arm forming or fixed to a cover member.

The assembly arrangement may include a first assembly arrangement, such as a lower assembly arrangement e.g. a foot extending from the device body, and a second assembly arrangement, e.g. an upper assembly arrangement such as an arm extending from the device body, which can be reversibly or irreversibly fixed to the machine, e.g. to a machine tank and/or to a main machine body, by fastening the first and second arrangements to one another.

The assembly arrangement may include any connector that reversibly or irreversibly fixes directly or indirectly the connecting device to the machine, e.g. a machine's tank and/or machine's main body, such as a mechanical or physical or chemical connector, e.g. one or more of hooks, clips, snaps, clamps, rivets, screws, nails, friction fasteners, geometric fasteners, magnetic connectors, gluing areas and welding areas.

For instance, when fixed together, the first and second arrangements may:
  extend over two extremities of the machine, e.g. over the tank and/or main machine body, to form a clamp secured on the machine, e.g. on the tank and/or main machine body, the two extremities forming for instance a top and bottom part of the machine, e.g. of the tank and/or of the main machine body; and/or
  extend externally over and around the machine, e.g. externally over and around the tank and/or the main machine body, and optionally passing through an opening of the tank into the tank and/or of the main machine body; and/or
  delimit between them an opening for the external system to be connected to the inlet.

In an embodiment, the device body is made of a first part and a second part. The first part comprises the first assembly arrangement and the second part comprises the second assembly arrangement. The first and second assembly arrangements are reversibly or irreversibly fixed to the machine by assembling the first and second parts together by the fixing arrangement.

For instance, at least one of the first and second parts includes an outer housing by which it is assembled to the other part, e.g. each part having an outer housing whereby the parts are assembled together via their respective outer housings. For instance, one part of the first and second parts comprises the inlet, the outlet, the valve arrangement and the control unit, optionally the inlet and/or the outlet extending through the other part of the first and second parts such as through an opening delimited by a housing of the other part e.g. an opening delimited by a housing of the first part and a housing of the second part.

The connecting device typically includes a sensor arrangement connected to the control unit that is configured to switch the valve arrangement in response to a triggering signal from the sensor arrangement.

For instance, the sensor arrangement is arranged to sense a level of liquid in a liquid tank (e.g. a buffer), part of the machine, of the device or separate therefrom (self-standing). When the machine and the device are arranged to operate without liquid tank, the senor arrangement may be arranged to sense a request for beverage processing in the machine for immediate supply of liquid and processing in the machine to prepare a beverage, e.g. an on-demand liquid supply. In practice, such a sensor arrangement (for configurations without liquid tank) may be part of a user-interface, e.g. a user-button such as a touch or proximity (e.g. capacitive) button, for initiating a beverage preparation.

The sensor arrangement may include at least one sensor selected from an optical sensor, an electric sensor, e.g. a capacitive sensor, and a float sensor for sensing a float in a machine tank or a device tank. The technical details of such sensors is well known in the field and are for instance discussed in EP 2 228 633 and U.S. Pat. No. 8,387,455.

The outlet can be configured to deliver liquid from the external system into a tank of the machine or of such connecting device. It is also possible that the machine is provided with a machine tank and the connecting device with a connecting device tank (different to the machine tank).

When the machine has a tank, the tank typically has an upper opening, such as an opening delimited by a rim of the tank. The tank can be delimited by a bottom part and a peripheral wall extending from and above the bottom part towards the opening.

Examples of beverage preparation machines with suitable storage tanks are disclosed in EP 2 228 633, WO 2009/074550, WO 2010/046442, WO 2010/128109, WO 2011/083103, WO 2011/089210, WO 2011/144723, WO 2012/055767 and WO 2013/104643, which are hereby incorporated.

For instance, the sensor arrangement includes a low level sensor for detecting a low level of liquid in the tank to generate a triggering signal for switching the valve arrangement to the open configuration so as to fill the tank with liquid delivered by the outlet.

The control unit can be arranged to switch the valve arrangement into the closed configuration:
  when a predetermined period of time has lapsed after switching the valve arrangement into the open configuration, the predetermined period of time being optionally user-adjustable, e.g. to adjust to a flow rate of liquid supplied from the external delivery system and/or to adjust to a maximum storage volume of the tank; and/or when a further level sensor detecting an overfill level above the high level generates a triggering signal for switching the valve arrangement or when a predetermined volume of liquid measured by a further sensor connected to the control unit has been delivered via the outlet, the predetermined volume being optionally user-adjustable, e.g. to adjust to a maximum storage volume of the tank.

For instance, the sensor arrangement includes a high level sensor for detecting a high level of liquid in the tank to generate a triggering signal for switching the valve arrangement to the closed configuration. For example, the control unit is configured so as to intermittently read the high level sensor, e.g. at time intervals in the range of 1 to 20 or 30 min., and maintain the valve arrangement in the closed configuration as long as a high level of liquid is detected and then temporarily switch the valve arrangement into the open configuration until the high level of liquid is again detected whereby the high level sensor is read continuously or at short intervals by the control unit, such as intervals of less than 5 second e.g. intervals in the range of 0.1 to 3 seconds.

For instance, the sensor arrangement includes a low level sensor for detecting a low level of liquid in the tank to generate a triggering signal for switching the valve arrangement to the open configuration so as to fill the tank with liquid delivered by the outlet and a high level sensor for detecting a high level of liquid in the tank to generate a triggering signal for switching the valve arrangement to the closed configuration. For example, the control unit is also arranged to switch the valve arrangement into the closed configuration:

when a predetermined period of time has lapsed after switching the valve arrangement into the open configuration, the predetermined period of time being optionally user-adjustable, e.g. to adjust to a flow rate of liquid supplied from the external delivery system and/or to adjust to a maximum storage volume of the tank; and/or when a further sensor provides a signal to the control unit that indicates that the high level has been exceeded.

Such further sensor can include: a further level sensor connected to the control unit and arranged to generate a triggering signal for switching the valve arrangement when a predetermined level above the high level is detected; and/or a flowmeter connected to the control unit and measuring a volume of liquid that is delivered via the outlet, the valve arrangement being switched into the closed configuration when the measured volume reaches a predetermined volume, the predetermined volume being optionally user-adjustable, e.g. to adjust to a maximum storage volume of the tank.

Hence, the device can be operated with a high level sensor and a low level sensor to refill the tank when empty or close to being empty and in a manner to avoid overflow.

Alternatively, the device can be operated with a single high or low level sensor to detect when the tank needs to be refilled (or not refilled) and a time measuring system (e.g. as described above) and/or flow-meter arrangement to avoid excessive filling or emptying (open loop control of the filling state of the tank).

In a safer embodiment, the device operates both with low and high level sensors on the one hand and with a time measuring system and/or flow-meter system on the other hand. Hence, an isolated failure of a sensor, a flow-meter or the time measuring system does not lead to an overflow of the tank.

The connecting device can have a member bearing the sensor arrangement.

The member may extend in a generally upright direction and/or in a generally horizontal direction arranged to generally match a wall of the machine, such as a peripheral wall of a tank of the machine, along (a) corresponding direction(s), when such device is fixed to the tank.

The member can extend in a generally upright direction in a manner as to generally extend along the thank wall inside or outside a tank of the machine, when such device is fixed to the tank.

The member may form a wall of the device body, such as a wall of a housing of the body.

The member can be formed by a PCB which interfaces at least one or two sensor(s) of the sensor arrangement to the control unit.

The connecting device can form a user-removable accessory fixed to a tank of the machine and/or a main body of the machine so that the outlet is positioned for delivering liquid into the tank and/or into the main body via an upper opening of the tank and/or main body. The device may include a sensor arrangement connected to the control unit that is configured to switch the valve arrangement in response to a triggering signal from the sensor arrangement, the assembly arrangement being configured for fixing such device to the tank and/or main body so that the sensor arrangement extends inside the tank via a tank opening or is located adjacent a peripheral tank wall externally to the tank, so as to generate a triggering signal when the liquid reaches a predetermined level in the tank.

The main body of the connecting device may have an overhanging arm arranged to extend over a tank opening of the tank and optionally into the tank via the opening, the overhanging arm being formed of or holding at least one of the outlet and the sensor arrangement. The overhanging arm can include a connecting portion for connecting a cover member that is configured to cover the opening of the tank. For instance, the outlet and/or the sensor arrangement extends through the connecting portion or forms the connecting portion or is integral with the connecting portion and the cover member.

The connecting device can include a cover member that is configured to close a tank opening of the tank, the cover member delimiting a passage, such as a through hole, through which the outlet extends or through which the outlet can deliver liquid into the tank. For instance, the sensor arrangement when present extends through the passage or through a different passage delimited by the cover member into the tank or is confined outside the tank.

The cover member may have an assembly arrangement for reversibly assembling the cover member to at least one of the tank, such as to a rim delimiting the tank opening, and/or to a main machine body of the beverage machine e.g. by being hooked to the main machine body.

The assembling of the cover member to the storage tank and/or to machine's main machine body may be implemented in the manner by which ordinary tank covers are assembled thereto, e.g. as discussed in the references cited above.

The valve arrangement can include two or more valves that are in serial fluidic configuration between the inlet and the outlet.

Two such valves that are in serial fluidic configuration can be controlled in parallel by the control unit to be both simultaneously open for establishing the fluidic connection between the inlet and the outlet or both simultaneously closed for interrupting the fluidic connection.

Two such valves that that are in serial fluidic configuration may be controlled separately so that: a first valve (e.g. a main or control valve) of such valves is open or closed for establishing or interrupting the fluidic connection between the inlet and the outlet as required for supplying liquid to the machine; and a second valve (e.g. a backup or safety valve) of such valves is open as long as the first valve opens and closes as controlled by the control unit and is then closed when the first valve is malfunctioning (e.g. mechanical and/or electric failure so that it does not (fully) close anymore). For instance, at least one sensor, e.g. a flowmeter and/or an overfill level sensor, is connected to the control unit for sensing an on-going flow of liquid via the inlet and the outlet after the control unit has attempted to switch the first valve into its closed configuration and for triggering the control unit to switch the second valve into its closed configuration.

Hence, by providing a serial fluidic arrangement of a plurality of valves (e.g. two valves) that are controlled in parallel (e.g. in the same manner) or separately, the possibility of mal-functioning of one valve, e.g. because of mechanical failure or electrical failure or lime clogging of this valve, does not prevent the other valve(s) from being closed and from interrupting the fluidic connection. It follows that a malfunction of one valve (e.g. unable to fully interrupt the fluidic connection) does not lead to an overflow of the tank.

The control unit may be arranged to detect a malfunctioning of at least one valve to then indicate to a user such malfunctioning via an indicator and/or block the non-malfunctioning valve in its closed configuration with or without automatically switching-off the connecting device.

The invention also relates to a combination formed of a connecting device as described above and a beverage machine. The device is arranged to connect the machine with an external liquid delivery system, e.g. a water distribution network, to supply such liquid to the machine.

The machine can have an inlet for supplying an ingredient, such as an ingredient contained in a cartridge, to be processed with the liquid in a processing and delivery unit to prepare a beverage. The inlet usually has an ingredient passage with or without a loading device for transporting the ingredient at the inlet. Examples of such arrangements are disclosed in EP EP 1447034, WO 01/84993, WO 02/078499, WO 03/056987, WO 2012/072766, WO 2012/093107, WO 2012/126971, WO 2014/056821, WO 2014/056641 and WO 2014/056642.

The machine may have an outlet for delivering a beverage from a processing and delivery unit. Any outlet is contemplated. Examples of advantageous outlets are disclosed in WO 2006/050769, WO 2011/095502, WO 2012/055765, WO 2012/072758 and WO 2013/127907.

The outlet may be located above a support for placing a user-recipient, e.g. a cup or a mug, for collecting the beverage delivered by the outlet. Suitable examples of such supports are disclosed in EP 1943931, EP 1867260, EP 2189087, EP 2189088, EP 2189089, WO 2009/074557, WO 2011/154492, WO 2012/007313 and WO 2013/104636.

The machine may have an actuator, such as a handle or a motor, for actuating the beverage processing and delivery unit for receiving in and/or evacuating from the unit an ingredient, such as an ingredient contained in a cartridge. Suitable examples of such actuators and actuated beverage processing and delivery units are disclosed in U.S. Pat. No. 8,272,319, WO 2004/071259, WO 2005/004683, WO2007/135136, WO 2009/043630, WO 2010/015427, WO 2012/025258, WO 2012/025259, WO 2013/127476, WO 2014/056810, WO 2014/056862, WO 2014/060370, WO 2014/096122 and WO 2014/096123.

The machine can have a pump for pumping the liquid from the tank to a beverage delivery outlet. Examples of suitable pumps and/or their integration in the fluid line of beverage preparation machines are disclosed in WO 2009/024500, WO 2009/150030, WO 2010/006953, WO 2011/107574, WO 2010/108700 and WO 2013/098173.

The machine may include a mixing chamber for mixing the liquid driven by the pump with an ingredient such as an ingredient contained in a cartridge. Examples of mixing chambers can be found in the references listed in relation with the actuated beverage processing and delivery unit.

The machine may include thermal conditioner, such as a heater and/or a cooler, for thermally conditioning the liquid supplied from the tank, e.g. via a tank outlet. Examples of thermal conditioners and and/or their integration in the fluid line of beverage preparation machines are disclosed in U.S. Pat. No. 8,646,377, WO 01/54551, WO 2004/006742, WO 2006/029763, WO 2009/092746, WO 2009/043851, WO 2009/043865 and WO 2011/157675.

The machine may include a machine control unit such as a control unit with a user-interface. Implementation examples of control units and user-interfaces in beverage preparation machines are for example disclosed in WO 2008/138710, WO 2009/043865, WO 2009/135821, WO 2010/003932, WO 2010/037806, WO 2010/046442, WO 2011/020779, WO 2011/026853, WO 2011/029813, WO 2011/144719, WO 2011/144720, WO 2012/007260, WO 2012/032019 and WO 2012/072764.

The machine can comprise an electric connector for supplying power via a power connector to the connecting device, e.g. as disclosed in WO 2009/074555.

The machine can have a liquid storage tank with an upper opening for supplying liquid into the tank, such as an opening delimited by a rim of the tank. The tank can be delimited by a bottom part and a peripheral wall extending from and above the bottom part towards the opening and/or having a tank outlet for dispensing liquid to a beverage processing and delivery unit of the machine.

The machine may have a removable tank lid for covering the tank. The tank lid may be compatible with the connecting device when the connecting device is used with the machine or the tank lid may be removed from the tank for using the connecting device. When the tank lid is removed, the connecting device may comprise a cover member that replaces the tank lid and that allows the refilling of the tank via the connecting device (usually through the cover member). The tank lid (or the device's cover member) may be secured to the machine's main body or to the tank or to both. An example of a tank lid (that can be modified for the connecting device, either as a part of the connecting device (as its cover member) or as part of the beverage machine or that can be used as such when the beverage machine is not combined with the connecting device) is taught in WO 2011/089210.

The beverage preparation machine can be an in-home or out of home machine. The machine may be for the preparation of coffee, tea, chocolate, cacao, milk, soup, baby food, etc. . . . The machine may be arranged for preparing within a beverage processing module a beverage by passing hot or cold water or another liquid through a cartridge containing an ingredient, such as a flavouring ingredient, of the beverage to be prepared, such as ground coffee or tea or chocolate or cacao or milk powder.

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. The liquid may be supplied manually and/or via the external delivery system.

For instance, a predetermined amount of beverage is formed and dispensed on user-request, which corresponds to a serving. The volume of such a serving may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. . . . For example, a coffee machine may be configured for dispensing espressos, e.g. an adjustable volume of 20 to 60 ml per serving, and/or for dispensing lungos, e.g. a volume in the range of 70 to 150 ml per serving.

Hence, the connecting device can be mounted very easily onto the machine, for instance onto a machine's tank and/or machine's main body, e.g. as a two part arrangement and secured to the machine (e.g. the machine's tank and/or main body) by fastening the two parts of the connecting device together by the assembly arrangement, e.g. the fixing arrangement.

The fastening of the two parts may be "accessible", i.e. easily unfastenable by a user without effort (e.g. by using a user-toggle or lock), it can be "readily accessible", i.e. unfastenable by an untrained user without damaging the connecting device (e.g. by using screws). In general, the assembly arrangement resulting from such fastening, e.g. by using a corresponding fixing arrangement, is considered to be reversibly.

When the fastening is "not accessible", the unfastening involves a destruction of at least one part of the connecting device or of the fixing arrangement or it requires a special tool or key (e.g. not widely spread) or requires a special knowledge (provided by corresponding special training) of the connecting device and its structure to know how to disassemble it. In general, the assembly arrangement resulting from such fastening, e.g. by using a corresponding fixing arrangement, is considered to be irreversibly.

BRIEF DESCRIPTION OF THE DRAWINGS

The invention will now be described with reference to the schematic drawings, wherein.

DETAILED DESCRIPTION

Figures 1, 2, 3:
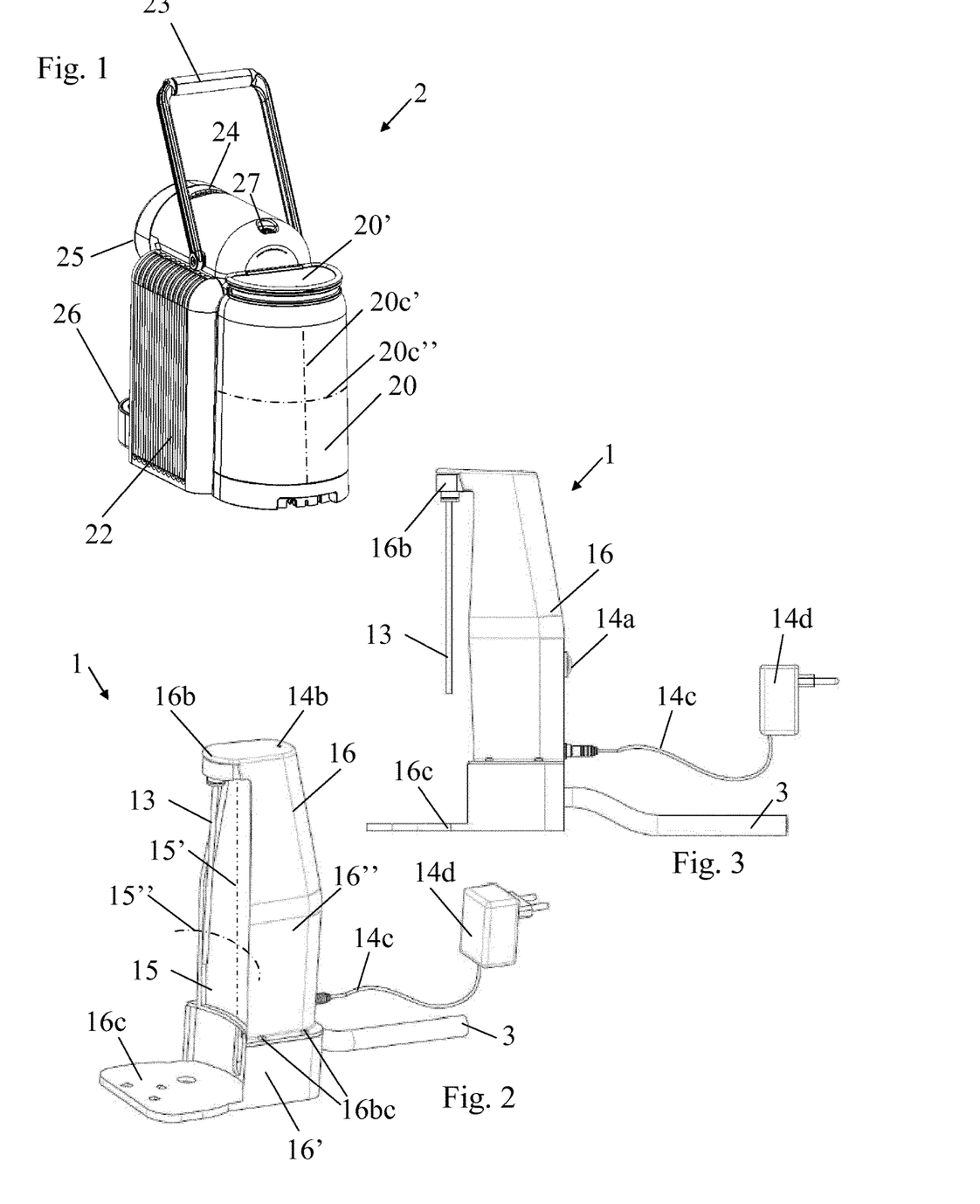
FIG. 1 illustrates a beverage preparation machine having a tank which can be fitted with a exemplary connecting device in accordance with the invention.
FIGS. 2 and 3 show a perspective view and a side view, respectively, of such a connecting device.
Figure 4:
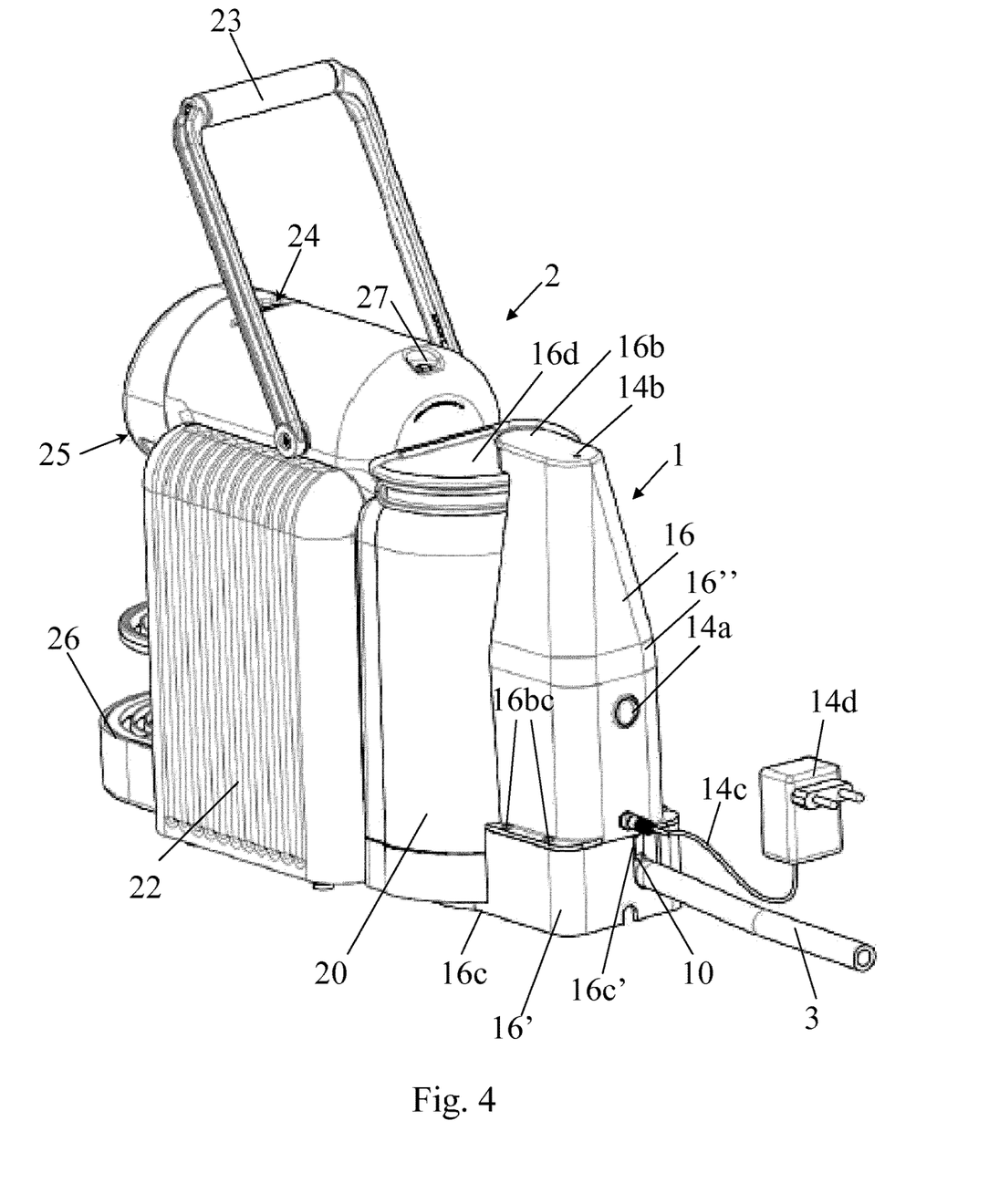
FIG. 4 illustrates a beverage preparation machine fitted with such a connecting device.
Figure 5:
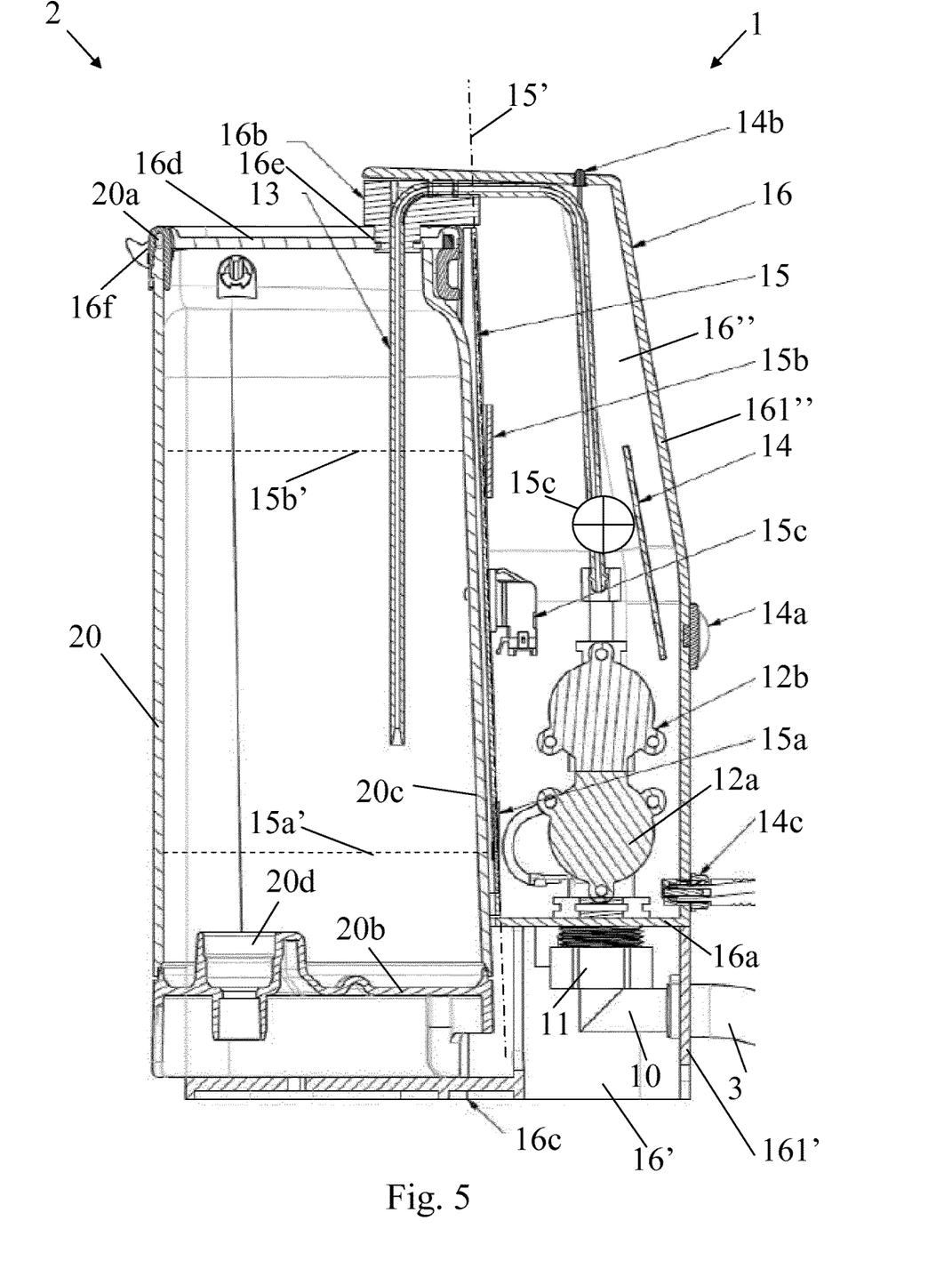
FIG. 5 is a cross-sectional view of part of a beverage machine fitted with such a connecting device.

FIGS. 1 to 3 illustrates a beverage preparation machine 2 that can be retrofitted with a connecting device 1 shown in FIGS. 2 to 4 in a manner illustrated in FIG. 5.

Thus an exemplary connecting device 1 is illustrated in FIGS. 2 and 3 for connecting a beverage machine 2 (shown in FIG. 1) with an external liquid delivery system 3, e.g. a water distribution network, to supply such liquid to machine 2, in a manner illustrated in FIGS. 4 and 5.

Machine 2 can have an inlet 24 for supplying an ingredient, such as an ingredient contained in a cartridge, to be processed with the liquid in a processing and delivery unit 24, 25 to prepare a beverage.

Machine 2 may include an outlet 25 for delivering a beverage from a processing and delivery unit 24, 25 such as an outlet 25 located above a support 26 for placing a user-recipient, e.g. a cup or a mug, for collecting the beverage delivered by outlet 25.

Machine 2 can comprise an actuator, such as a handle or a motor, for actuating a beverage processing and delivery unit 24, 25 for receiving in and/or evacuating from unit 24, 25 an ingredient, such as an ingredient contained in a cartridge.

Machine 2 can have a pump for pumping liquid from tank outlet 20d to a beverage delivery outlet 25, optionally via a mixing chamber for mixing the liquid with an ingredient such as an ingredient contained in a cartridge.

Machine 2 may include a thermal conditioner, such as a heater and/or a cooler, for thermally conditioning the liquid from tank outlet 20d.

Machine 2 can comprise a machine control unit such as a control unit with a user-interface 27.

Machine 2 may have an electric connector for supplying power via a power connector 14c, 14d to connecting device 1.

Machine 2 can include a liquid storage tank 20 with an upper opening 20a for supplying liquid into the tank, such as an opening 20a delimited by a rim of tank 20, optionally tank 20 being delimited by a bottom part 20b and a peripheral wall 20c extending from and above bottom part 20b towards opening 20a and/or having a tank outlet 20d for dispensing liquid to a beverage processing and delivery unit 24, 25 of machine 2.

Machine 2 may comprise a removable tank lid 20', such as a tank lid 20' replaceable by a cover member 16 comprised by connecting device 1.

Furthermore, tank 20 may have a (solid) tank lid 20' covering opening 20a, lid 20' being removable for filling tank 20. When connecting device 1 is fixed to tank 20, lid 20' may be removed so that opening 20a remains open or is covered by a cover member 16d that is fixed to connecting device 1 and (re-)movable en bloc with device 1. Hence, tank 20 may nevertheless remain covered when (retro-)fitted with connecting device 1.

Connecting device 1 typically has: a device body 16; an inlet 10 for a fluid connection to external system 3; an outlet 13 for delivering liquid from external system 3 via the inlet 10 to beverage machine 2; a valve arrangement 12a, 12b switchable between an open configuration for establishing a fluidic connection between inlet 10 and outlet 13 and a closed configuration for interrupting the fluidic connection; and a control unit 14 for switching valve arrangement 12a, 12b between its open configuration and its closed configuration.

Typically, control unit 14 is connected to at least one of: a power source via a power connector 14c, 14d; and a user interface 14a, 14b such as an interface comprising a and/or reset switch 14a (e.g. an on/off switch and/or a switch for resetting device 1) 14a and/or a control indicator e.g. a control light 14b. The power source may be provided by beverage preparation machine 2 itself or may be external to device 1 and to machine 2, for instance the mains. Power connector 14c, 14d may include an electric cable 14c and a plug 14d. Power connector 14c, 14d may include a voltage transformer, e.g. within plug 14d or on control unit 14.

For instance, valve arrangement 12a, 12b is connected to inlet 10 via a fluid connector 11 e.g. a fluid connector 11 fixed to a frame portion 16a of body 16.

Device body 16 has an assembly arrangement 16c; 16b, 16d, 16e, 16f for reversibly or irreversibly assembling device body 16 to machine 2, such as to a tank 20 and/or to a main machine body 22 of machine 2.

Assembly arrangement 16c; 16b, 16d, 16e, 16f may include a lower assembly arrangement 16c, such as a foot extending from the device body 16, for reversibly or irreversibly assembling device body 16 to a lower part 20b of a machine tank 20 and/or to a lower part of a main machine body 22. For instance, lower assembly arrangement 16c has a platform projecting from a bottom part of device body 16 and/or extending under outlet 13.

Assembly arrangement 16c; 16b, 16d, 16e, 16f can include an upper assembly arrangement 16b, 16d, 16e, 16f, such as a top extending from device body 16, for reversibly or irreversibly assembling device body 16 to an upper part 20a of a machine tank 20 and/or to an upper part of a main machine body 22. For instance, upper assembly arrangement 16b, 16d, 16e, 16f has an arm 16b projecting from a top part of device body 16 and/or extending above outlet 13, such as an arm forming or fixed to a cover member 20d.

Assembly arrangement 16c; 16b, 16d, 16e, 16f may include a first assembly arrangement 16c, such as a lower assembly arrangement e.g. a foot 16c extending from device body 16, and a second assembly arrangement 16b, 16d, 16e, 16f, e.g. an upper assembly arrangement such as an arm 16b extending from device body 16, which can be reversibly or irreversibly fixed to machine 2, e.g. to a machine tank 20 and/or to a main machine body 22, by fastening first and second arrangements 16b, 16c, 16d, 16e, 16f to one another by a fixing arrangement 16bc. Arrangement 16bc may include any connector that reversibly or irreversibly fixes directly or indirectly such connecting device 1 to machine 2, e.g. to a machine's tank 20 and/or machine's main body 22, such as a mechanical or physical or chemical connector, e.g. one or more of hooks, clips, snaps, clamps, rivets, screws, nails, friction fasteners, geometric fasteners, magnetic connectors, gluing areas and welding areas.

When fixed together, first and second arrangements 16b, 16c, 16d, 16e, 16f may:
  extend over two extremities of machine 2, e.g. over tank 20 and/or main machine body 22, to form a clamp secured on machine 2, e.g. on tank 20, two extremities forming for instance a top and bottom part of machine 2, e.g. of tank 20 and/or of main machine body 22; and/or
  extend externally over and around machine 2, e.g. externally over and around tank 20 and/or main machine body 22, and optionally passing through an opening 20a of tank 20 into tank 20 and/or of main machine body 22; and/or
  delimit between them an opening 16c' for external system 3 to be connected to inlet 10.

Device body 16 can be made of a first part 16' and a second part 16", first part 16' comprising first assembly arrangement 16c and second part 16" comprising second assembly arrangement 16b, 16d, 16e, 16f, first and second assembly arrangements 16c; 16b, 16d, 16e, 16f being reversibly or irreversibly fixed to machine 2 by assembling first and second parts 16',16" together by fixing arrangement 16bc.

At least one of first and second parts 16',16" may include an outer housing 161',161" by which it is assembled to the other part. For instance each part 16',16" has an outer housing 161',161" whereby parts 16',16" are assembled together via their respective outer housings 161',161".

One part 16" of first and second parts 16',16" can comprise inlet 10, outlet 13, valve arrangement 12a, 12b and control unit 14. For instance, inlet 10 and/or outlet 13 extend(s) through the other part 16' of first and second parts 16',16" such as through an opening 16c' delimited by a housing 161' of other part 16', e.g. an opening delimited by a housing 161' of first part 16' and a housing of the second part 16".

Device 1 may include a sensor arrangement 15a, 15b connected to control unit 14 that is configured to switch valve arrangement 12a, 12b in response to a triggering signal from sensor arrangement 15a, 15b. For instance, sensor arrangement 15a, 15b includes at least one sensor selected from an optical sensor, an electric sensor, e.g. a capacitive sensor, and a float sensor for sensing a float in a machine or device tank 20. Outlet 13 can be configured to deliver liquid from external system 3 into a tank 20 of machine 2 or of such connecting device 1.

Sensor arrangement 15a, 15b may include a low level sensor 15a for detecting a low level 15a' of liquid in tank 20 to generate a triggering signal for switching valve arrangement 12a, 12b to the open configuration so as to fill tank 20 with liquid delivered by outlet 13. For instance, control unit 14 is arranged to switch valve arrangement 12a, 12b into the closed configuration:
  when a predetermined period of time has lapsed after switching valve arrangement 12a, 12b into the open configuration, the predetermined period of time being optionally user-adjustable, e.g. to adjust to a flow rate of liquid supplied from external delivery system 3 and/or to adjust to a maximum storage volume of tank 20; and/or
  when a further level sensor detecting an overfill level above high level 15b' generates a triggering signal for switching the valve arrangement or when a predetermined volume of liquid measured by a further sensor 15c connected to control unit 14 has been delivered via outlet 13, the predetermined volume being optionally user-adjustable, e.g. to adjust to a maximum storage volume of tank 20.

Sensor arrangement 15a, 15b may include a high level sensor 15b for detecting a high level 15b' of liquid in tank 20 to generate a triggering signal for switching valve arrangement 12a, 12b to the closed configuration. For instance, control unit 14 is configured so as to intermittently read high level sensor 15b, e.g. at time intervals in the range of 1 to 20 or 30 min., and maintain valve arrangement 12a, 12b in the closed configuration as long as a high level 15b' of liquid is detected and then temporarily switch the valve arrangement 12a, 12b into the open configuration until high level 15b' of liquid is again detected whereby high level sensor 15b is read continuously or at short intervals by control unit 14, such as intervals of less than 5 second e.g. intervals in the range of 0.1 to 3 s.

Sensor arrangement 15a, 15b may have a low level sensor 15a for detecting a low level 15a' of liquid in tank 20 to generate a triggering signal for switching valve arrangement 12a, 12b to the open configuration so as to fill tank 20 with liquid delivered by outlet 13 and a high level sensor 15b for detecting a high level 15b' of liquid in tank 20 to generate a triggering signal for switching valve arrangement 12a, 12b to the closed configuration. For instance, control unit 14 is also arranged to switch valve arrangement 12a, 12b into the closed configuration:

when a predetermined period of time has lapsed after switching valve arrangement 12a, 12b into the open configuration, the predetermined period of time being optionally user-adjustable, e.g. to adjust to a flow rate of liquid supplied from external delivery system 3 and/or to adjust to a maximum storage volume of tank 20; and/or when a further sensor 15c provides a signal to control unit 14 that indicates that high level 15b' has been exceeded.

Generally speaking, further sensor 15c may include:

a further level sensor connected to control unit 14 and arranged to generate a triggering signal for switching the valve arrangement when a predetermined level above high level 15b' is detected; and/or a flowmeter 15c connected to control unit 14 and measuring a volume of liquid that is delivered via outlet 13, the valve arrangement being switched into the closed configuration when the measured volume reaches a predetermined volume, the predetermined volume being optionally user-adjustable, e.g. to adjust to a maximum storage volume of tank 20.

Device 1 may include a member 15 bearing sensor arrangement 15a, 15b. For instance, member 15 has one or more of the following features a) to d):

a) member 15 extends in a generally upright direction 15' and/or in a generally horizontal direction 15" arranged to generally match a wall 20c of machine 2, such as a peripheral wall 20c of a tank 20 of machine 2, along (a) corresponding direction(s) 20c', 20c", when such device 1 is fixed to tank 20;

b) member 15 extends in a generally upright direction in a manner as to generally extend along thank wall 20c inside or outside a tank 20 of machine 2, when such device 1 is fixed to tank 20;

c) member 15 forms a wall 15 of device body 16, such as a wall 15 of a housing 161', 161" of body 16;

d) member 15 is formed by a PCB which interfaces at least one or two sensor(s) 15a, 15b of sensor arrangement 15a, 15b to control unit 14.

Device 1 can form a user-removable accessory 1 fixed to a tank 20 and/or a main body 22 of machine 2 so that outlet 13 is positioned for delivering liquid into tank 20 and/or main body 22 via an upper opening 20a of tank 20 and/or main body 22.

Device 1 may include comprises a sensor arrangement 15a, 15b connected to control unit 14 that is configured to switch valve arrangement 12a, 12b in response to a triggering signal from sensor arrangement 15a, 15b. Assembly arrangement 16c, 16d can be configured for fixing such device 1 to tank 20 and/or main body 22 so that sensor arrangement 15a, 15b extends inside tank 20 via a tank opening 20a or is located adjacent a peripheral tank wall 20c externally to tank 20, so as to generate a triggering signal when the liquid reaches a predetermined level 15a', 15b' in tank 20.

The connecting device may be connected to and use sensors that are integrated in the beverage machine to monitor the tank.

Device body 16 can have an overhanging arm 16b arranged to extend over a tank opening 20a of tank 20 and optionally into tank 20 via opening 20a, overhanging arm 16 being formed of or holding at least one of outlet 13 and the sensor arrangement. Overhanging arm 16b may include a connecting portion 16e for connecting a cover member 16d that is configured to cover opening 20a of tank 20. For instance, outlet 13 and/or the sensor arrangement extend(s) through connecting portion 16e or forming the connecting portion or being integral with the connecting portion and cover member 16d.

Connecting device 1 may include a cover member 16d that is configured to close a tank opening 20a of tank 20, cover member 16d delimiting a passage 16e, such as a through hole, through which outlet 13 extends or through which the outlet can deliver liquid into tank 20. For instance, sensor arrangement 15a, 15b, when present, extends through this passage or through a different passage delimited by the cover member into the tank or is confined outside tank 20.

Generally speaking, cover member 16d can incorporate an assembly arrangement 16f for reversibly assembling cover member 16d to at least one of tank 20, such as to a rim delimiting tank opening 20a, and/or to a main machine body 22 of beverage machine 2 e.g. by being hooked to main machine body 22.

Valve arrangement 12a, 12b may include two or more valves 12a, 12b that are in serial fluidic configuration between inlet 10 and outlet 13.

At least two such valves 12a, 12b that are in serial fluidic configuration can be controlled in parallel by control unit 14 to be both simultaneously open for establishing the fluidic connection between inlet 10 and outlet 13 or both simultaneously closed for interrupting the fluidic connection.

At least two such valves 12a, 12b that are in serial fluidic configuration may be be controlled separately by control unit 14 so that a first valve 12a of such valves 12a, 12b is open or closed for establishing or interrupting the fluidic connection between inlet 10 and outlet 13 as required for supplying liquid to machine 2 and so that a second valve 12b of valves 12a, 12b is open as long as first valve 12a opens and closes as controlled by control unit 14 and is closed when first valve 12a is malfunctioning. For instance, at least one sensor 15c, e.g. a flowmeter and/or an overfill level sensor, is connected to control unit 14 for sensing an on-going flow of liquid via inlet 10 and outlet 13 after control unit 14 has attempted to switch first valve 12a into its closed configuration and for triggering control unit 14 to switch second valve 12b into its closed configuration.

Control unit 14 can be arranged to detect a malfunctioning of at least one valve 12a, 12b to then indicate to a user such malfunctioning via an indicator 14b and/or block the non-malfunctioning valve in its closed configuration with or without automatically switching-off such device 1.

The invention claimed is:

1. A connecting device for connecting a beverage machine with an external liquid delivery system to supply liquid to the beverage machine, the connecting device comprising:
   a device body;
   an inlet for a fluid connection to the external liquid delivery system;
   an outlet for delivering the liquid from the external liquid delivery system via the inlet to the beverage machine;
   a valve arrangement switchable between an open configuration for establishing a fluidic connection between the inlet and the outlet and a closed configuration for interrupting the fluidic connection;
   the valve arrangement is connected to the inlet by a fluid connector that is fixed to a frame portion of the device body;

a control unit for switching the valve arrangement between the open configuration and the closed configuration; and the device body has an assembly arrangement for reversibly or irreversibly assembling the device body to the beverage machine.

2. The connecting device of claim 1, wherein the assembly arrangement comprises at least one configuration selected from the group consisting of:
   a lower assembly arrangement for reversibly or irreversibly assembling the device body to a lower part of a beverage machine tank or to a lower part of a main body of the beverage machine; and
   an upper assembly arrangement for reversibly or irreversibly assembling the device body to an upper part of the beverage machine tank or to an upper part of the main body of the beverage machine.

3. The connecting device of claim 1, wherein the assembly arrangement comprises a first assembly arrangement and a second assembly arrangement, the first and second assembly arrangements are reversibly or irreversibly fixed to the beverage machine by fastening the first and second assembly arrangements to one another by a fixing arrangement, the first and second assembly arrangements when fixed together have at least one position selected from the group consisting of:
   extending over two extremities of the beverage machine;
   extending externally over and around the beverage machine; and
   delimiting between the first and second assembly arrangements, an opening for the external liquid delivery system to be connected to the inlet.

4. The connecting device of claim 3, wherein the device body comprises a first part and a second part, the first part comprising the first assembly arrangement and the second part comprising the second assembly arrangement, the first and second assembly arrangements being reversibly or irreversibly fixed to the beverage machine by assembling the first and second parts together by the fixing arrangement.

5. The connecting device of claim 1, comprising a sensor arrangement connected to the control unit that is configured to switch the valve arrangement in response to a triggering signal from the sensor arrangement, the sensor arrangement comprising at least one of:
   a low level sensor for detecting a low level of liquid in the tank to generate the triggering signal for switching the valve arrangement to the open configuration so as to fill the tank with liquid delivered by the outlet;
   or
   a high level sensor for detecting a high level of liquid in the tank to generate the triggering signal for switching the valve arrangement to the closed configuration.

6. The connecting device of claim 5, wherein the sensor arrangement further comprises at least one of:
   a further level sensor connected to the control unit and arranged to generate the triggering signal for switching the valve arrangement when a predetermined level above the high level is detected; or
   a flowmeter connected to the control unit and measuring a volume of liquid that is delivered via the outlet, the valve arrangement being switched into the closed configuration when the volume of liquid measured by the flowmeter reaches a predetermined volume.

7. The connecting device of claim 5, comprising a member bearing the sensor arrangement.

8. The connecting device of claim 1, comprising a user-removable accessory fixed to a tank and/or a main body of the beverage machine so that the outlet is positioned for delivering the liquid into the tank and/or the main body via an upper opening of the tank and/or the main body.

9. The connecting device of claim 8, comprising a sensor arrangement connected to the control unit that is configured to switch the valve arrangement in response to a triggering signal from the sensor arrangement and wherein the assembly arrangement is configured for fixing the connecting device to the tank and/or the main body so that the sensor arrangement extends inside the tank via a tank opening or is located adjacent a peripheral tank wall externally to the tank, so as to generate the triggering signal when the liquid reaches a predetermined level in the tank.

10. The connecting device of claim 8, wherein the device body has an overhanging arm arranged to extend over the upper opening of the tank.

11. The connecting device of claim 10, wherein the overhanging arm comprises a connecting portion for connecting a cover member that is configured to cover the upper opening of the tank.

12. The connecting device of claim 8, comprising a cover member that is configured to close the upper opening of the tank, the cover member defining a passage through which the outlet extends or through which the outlet delivers the liquid into the tank.

13. The connecting device of claim 12, wherein the cover member comprises an assembly arrangement for reversibly assembling the cover member to at least one of the tank or the main body of the beverage machine.

14. The connecting device of claim 1, wherein the valve arrangement comprises two or more valves that are in serial fluid configuration between the inlet and the outlet.

15. A combination formed of a beverage machine and a connecting device for connecting the beverage machine with an external liquid delivery system to supply liquid to the beverage machine, the connecting device comprising: a device body; an inlet for a fluid connection to the external liquid delivery system; an outlet for delivering the liquid from the external liquid delivery system via the inlet to the beverage machine; a valve arrangement switchable between an open configuration for establishing a fluidic connection between the inlet and the outlet and a closed configuration for interrupting the fluidic connection; the valve arrangement is connected to the inlet by a fluid connector that is fixed to a frame portion of the device body; a control unit for switching the valve arrangement between the open configuration and the closed configuration; and the device body has an assembly arrangement for reversibly or irreversibly assembling the device body to the beverage machine.

16. A combination formed of a beverage machine and a connecting device for connecting a beverage machine with an external liquid delivery system to supply liquid to the beverage machine, the connecting device comprising:
   a device body;
   an inlet for a fluid connection to the external liquid delivery system;
   an outlet for delivering the liquid from the external liquid delivery system via the inlet to the beverage machine;
   a valve arrangement switchable between an open configuration for establishing a fluidic connection between the inlet and the outlet and a closed configuration for interrupting the fluidic connection, the valve arrangement is connected to the inlet by a fluid connector that is fixed to a frame portion of the device body;
   a control unit for switching the valve arrangement between the open configuration and the closed configuration;

the device body has an assembly arrangement for reversibly or irreversibly assembling the device body to the beverage machine; and the beverage machine having at least one feature selected from the group consisting of:
- an inlet for supplying an ingredient to be processed with the liquid in a beverage processing and delivery unit to prepare a beverage;
- an outlet for delivering the beverage from the beverage processing and delivery unit for placing a user-recipient for collecting the beverage delivered by the outlet;
- an actuator for actuating the beverage processing and delivery unit for receiving in or evacuating from the beverage process and delivery unit the ingredient;
- a pump for pumping the liquid from a tank outlet to a beverage delivery outlet;
- a thermal conditioner for thermally conditioning the liquid from the tank outlet;
- a beverage machine control unit;
- an electric connector for supplying power via a power connector to the connecting device;
- a liquid storage tank with an upper opening for supplying liquid into the liquid storage tank; and
- a removable liquid storage tank lid.

17. The combination formed of the beverage machine and the connecting device according to claim 15, wherein the valve arrangement comprises two valves that are in serial fluid configuration between the inlet and the outlet, and the control unit is configured to detect a malfunctioning of at least one of the two valves and block a non-malfunctioning valve in the closed configuration.

18. The combination formed of the beverage machine and the connecting device according to claim 15, wherein the connecting device comprises a connecting device tank.

19. The combination formed of the beverage machine and the connecting device according to claim 16, wherein the beverage machine comprises one or more sensors configured to monitor a level of liquid in the liquid storage tank, and the connecting device is connected to the one or more sensors.

20. The combination formed of the beverage machine and the connecting device according to claim 16, wherein the connecting device comprises a sensor arrangement connected to the control unit that is configured to switch the valve arrangement in response to a triggering signal from the sensor arrangement and wherein the assembly arrangement is configured for fixing the connecting device to the tank and/or main body so that the sensor arrangement is located adjacent a peripheral tank wall externally to the tank, so as to generate the triggering signal when the liquid reaches a predetermined level in the tank.

* * * * *